Aug. 18, 1970 W. J. WALSH 3,524,968
THERMAL CONTROL FOR ELECTRICAL HEATING DEVICE
Filed Aug. 2, 1968 2 Sheets-Sheet 1
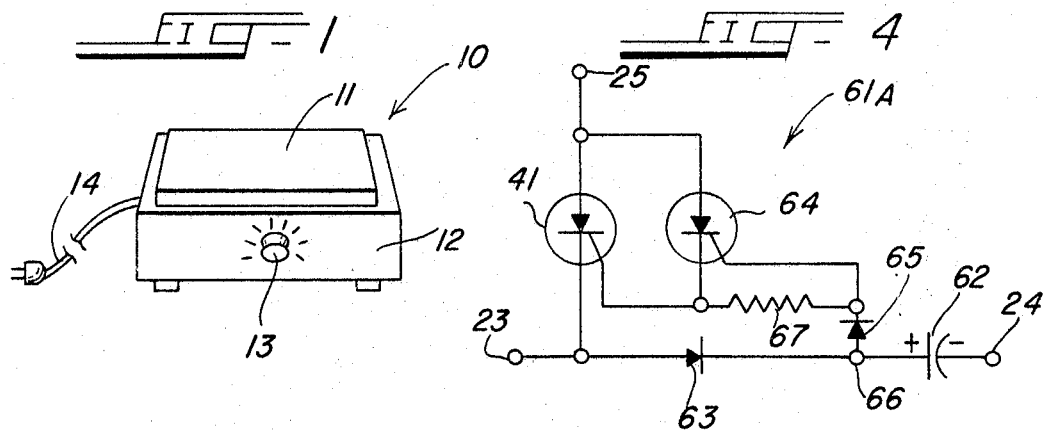
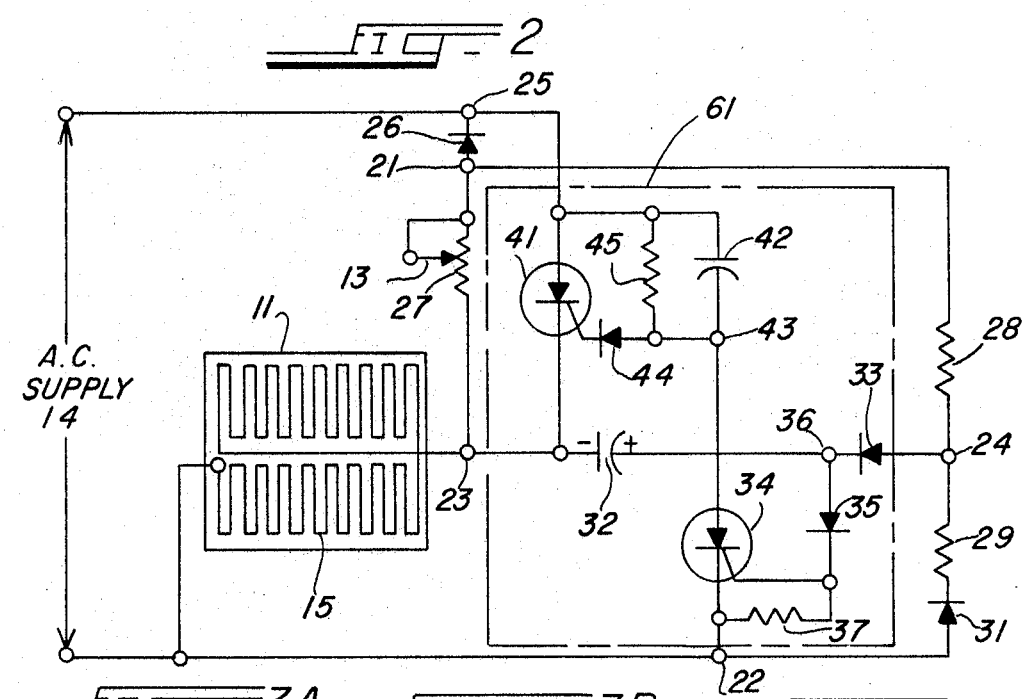
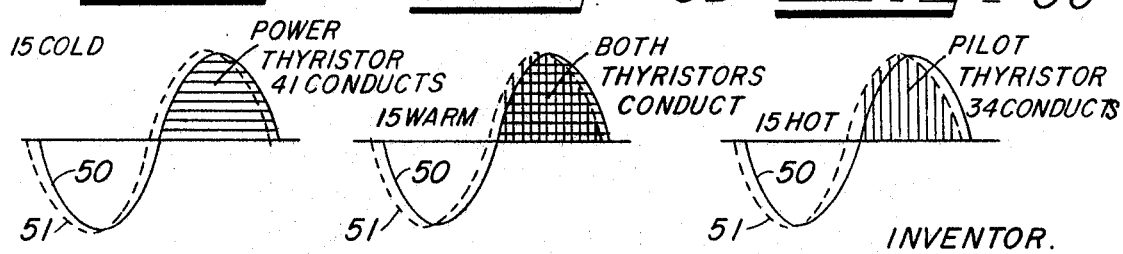
INVENTOR.
WILLIAM J. WALSH
BY Kinzer, Dorn & Zickert
ATTYS

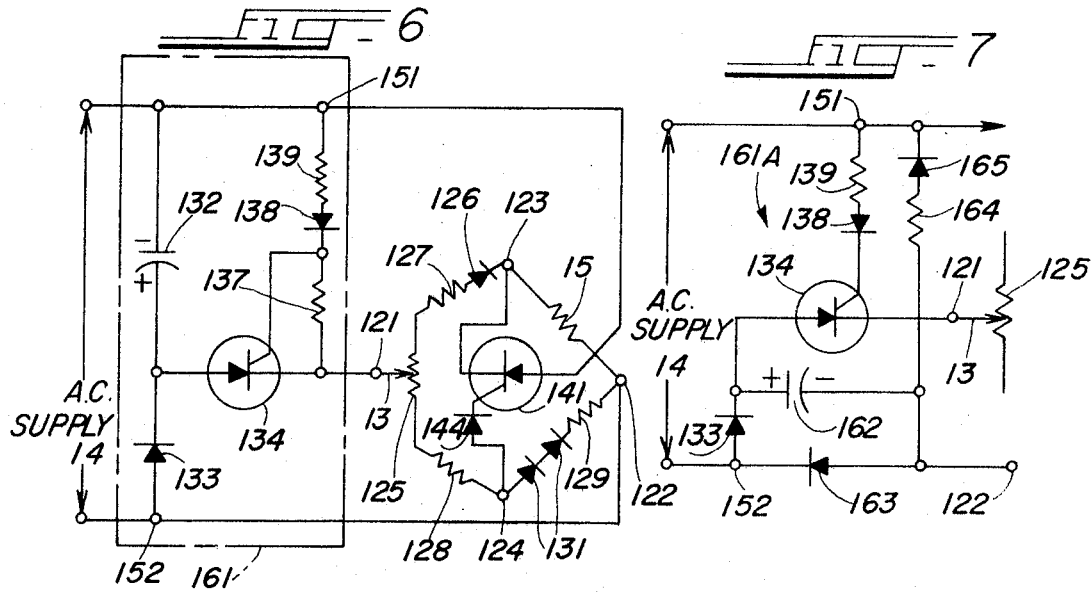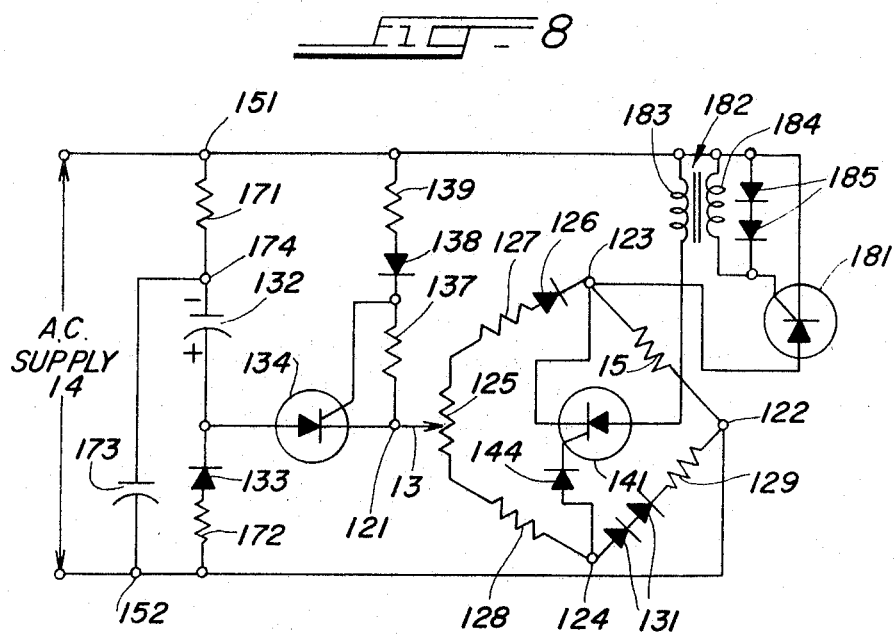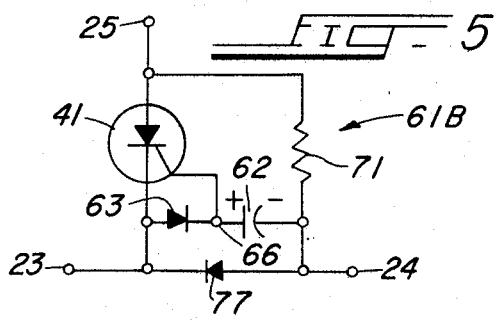

United States Patent Office 3,524,968
Patented Aug. 18, 1970

3,524,968
THERMAL CONTROL FOR ELECTRICAL HEATING DEVICE
William J. Walsh, Dubuque, Iowa, assignor to Thermolyne Corporation, Dubuque, Iowa, a corporation of Illinois
Filed Aug. 2, 1968, Ser. No. 749,652
Int. Cl. H05b 1/02
U.S. Cl. 219—499                 10 Claims

ABSTRACT OF THE DISCLOSURE

An electrical heating device, such as a hot plate, having a heating element of predictable positive thermal coefficient of resistivity connected in a bridge circuit that is part of a control which energizes the heating element in varying degrees in accordance with changes in its resistivity, affording accurate thermal control with no thermostat.

BACKGROUND OF THE INVENTION

There are a number of electrical heating devices employed in laboratories and in similar applications that require relatively close and accurate thermal control. A typical example is the electrical hot plate employed in a variety of different laboratory processes. Other examples are laboratory ovens, test tube heaters, and similar devices.

In laboratory apparatus of this general kind, thermal control is usually exercised by means of a thermostat mounted upon or otherwise associated with the heater of the device. Where precision control is required, the thermostat itself may be relatively complex in construction and hence may add materially to the cost of the electrical heating device with which it is used. In those devices using heaters with relatively large surfaces, the thermostat may be ineffective to afford the requisite accurate control unless it is specifically constructed to average the temperature across the heater area. Thus, a thermostat that responds only to temperature at the center of the heater may permit overheating and consequent damage to the heater if a cold load of relatively small surface area is placed on the center of the heater. In addition, the thermostat may present some difficulties in accurate calibration.

SUMMARY OF THE INVENTION

It is a principal object of the present invention, therefore, to provide a new and improved precision thermal control for laboratory hot plates and similar electrical heating devices that does not utilize a thermostat but instead provides for thermal control based on changes in the electrical characteristics of the heating element in the device.

Another object of the invention is to provide a settable high-sensitivity thermal control for a precision electrical heating device, such as a laboratory hot plate, that effectively and inherently averages temperature changes over the heating element surface and thus prevents damage due to overheating regardless of the size or positioning of the load on the heated surface.

A specific object of the invention is to provide a new and improved precision thermal control for an electrical heating device in which the heating element of the device is connected in a bridge circuit in which changes in the temperature of the heating element are sensed as changes in resistivity of the heating element, with means being provided to prevent interference between sensing and power energization of the heating element. A related object of the invention is to afford a bridge circuit thermal control of the kind described which nevertheless permits full wave energization of the heating element.

A corrollary object of the invention is to afford a relatively inexpensive and reliable precision thermal control for an electrical heating device such as a laboratory hot plate that eliminates any mechanical switching and requires no thermostat.

Accordingly, the invention is directed to an electrical heating device energized from an alternating current power supply and comprising a heating element having a substantial and predictable positive thermal coefficient of resistivity. The heating element is connected in one leg of a bridge circuit; means are provided for energizing the bridge from the A.C. power supply in a sensing mode during sensing intervals each comprising a given fractional portion of the supply cycle. Gating circuit means are connected to the bridge circuit to derive a gating signal representative of the instantaneous thermal condition of the heating element as indicated by changes in balance conditions in the bridge. The device further includes power switching means comprising at least one thyristor having input, output, and gate electrodes with the input and output electrodes connected in series between the power supply and the heating element. The gating signal is applied to the gate electrode of the thyristor to control energization of the heating element, in a conduction mode, through the thyristor.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be made as desired by those skilled in the art without departing from the present invention.

DESCRIPTION OF THE DRAWINGS

FIG. 1 is a perspective view of a laboratory hot plate illustrative of an electrical heating device in which the present invention may be incorporated;

FIG. 2 is a schematic circuit diagram of an electrical heating device control constructed in accordance with one embodiment of the present invention;

FIGS. 3A, 3B and 3C illustrate three different operating conditions for the sensing and power thyristors in the circuit of FIG. 2;

FIG. 4 is a schematic diagram of a modification of the circuit of FIG. 2 comprising another embodiment of the invention;

FIG. 5 illustrates another circuit modification for the control of FIG. 2 constituting an additional embodiment of the invention;

FIG. 6 is a schematic circuit of an electrical heating device control constructed in accordance with another embodiment of the invention;

FIG. 7 illustrates a circuit modification for the control of FIG. 6 in accordance with a further embodiment of the invention; and FIG. 8 is a schematic circuit diagram of an electrical heating device control constructed in accordance with a preferred embodiment of the invention.

DESCRIPTION OF THE PREFERRED EMBODIMENTS

FIG. 1 illustrates an electrical heating device 10 comprising a typical laboratory hot plate. The hot plate 10 includes a heater 11 supported upon a base 12. The hot plate is provided with an external thermal control 13 for adjusting the operating temperature of heater 11. The power supply connection for the hot plate comprises a conventional electrical connecting cord 14. For effective laboratory work, the thermal control system connected to the manual adjustment 13 must maintain heater 11 within a few degrees of any given temperature setting over a range that may, for example, be of the order of 600° F. or more.

FIG. 2 illustrates a thermal control circuit for the hot plate 10 that is constructed in accordance with one embodiment of the present invention. In FIG. 2, it is seen that the heater 11 of the device comprises a resistance heating element 15. Heating element 15 is formed of a material having a relatively high and predictable positive thermal coefficient of resistivity. In a laboratory hot plate, heating element 15 may constitute a thin film of silver or other metal applied by printed circuit techniques to an insulating coating on a metal support member and having an external insulator layer protecting the heating element. Other forms of heating elements may be utilized, so long as the heating element has a positive thermal coefficient of resistivity that is both substantial and predictable in nature.

Heating element 15 is connected in a bridge circuit having terminals 21, 22, 23 and 24. The heating element constitutes the leg of the bridge between terminals 22 and 23. Terminal 22 of the bridge circuit is connected to one of the conductors leading to the alternating current power supply connection 14. The opposite terminal 21 of the bridge is connected to the other power supply terminal 25 through a diode 26.

The leg of the bridge between terminals 21 and 23 comprises a potentiometer 27 having an adjustable tap that constitutes the external thermal control 13. The opposite leg of the bridge, between terminals 21 and 24, comprises a resistor 28. The fourth leg of the bridge, between terminals 22 and 24, comprises a resistor 29. A diode 31 may be connected in this leg of the bridge in series with resistor 29.

The thermal control illustrated in FIG. 2 further comprises a gating circuit means for deriving a gating signal from the bridge that is representative of the instantaneous thermal condition of heating element 15 as indicated by changes in balance conditions within the bridge. This gating circuit means comprises a capacitor 32 that is connected between bridge terminals 23 and 24 in series with a diode 33. The gating circuit means further comprises a pilot or gate thyriston 34, in this instance a signal controlled rectifier. The gate electrode of rectifier 34 is connected through a diode 35 to the common terminal 36 of capacitor 32 and diode 33. The cathode of rectifier 34 is connected to bridge terminal 22 and a resistor 37 is connected between the cathode and the gate electrode of the rectifier.

The thermal control of FIG. 2 also comprises a power switching means including a power thyristor 41. The anode of power thyristor 41 is connected directly to the A.C. supply terminal 25. Supply terminal 25 is also connected to a capacitor 42 that is in turn connected to the anode of the gate thyristor 34. A resistor 45 is connected in parallel with capacitor 42. The common terminal 43 between capacitor 42 and the anode of rectifier 34 is also connected through a diode 44 to the gate electrode of thyristor 41, which in this instance is a signal-controlled power rectifier.

The cathode of rectifier 41 is connected to bridge terminal 23. It is thus seen that the input and output electrodes of thyristor 41, comprising the anode and cathode, are connected in series between the power supply terminal 25 and the heating element 15 of the device, affording a means for energization of heating element 15 independently of the bridge circuit, as described more fully hereinafter.

In considering the operation of the thermal control illustrated in FIG. 2, it may first be assumed that power supply terminal 25 is driven negative with respect to power supply and bridge terminal 22. During the half cycle of the A.C. power supply in which these conditions prevail, referred to herein as the negative half cycle, the electrical current from terminal 22 flows upwardly through the resistance heating element 15, through potentiometer 27, and through diode 26 to terminal 25. Similarly, current flows from terminal 22 through diode 31 and resistors 29 and 28 and thence through diode 26 to terminal 25. During the negative half cycle, there is no appreciable current flow through thyristor 41 because the terminal connections for the thyristor are such that it is non-conductive. In the operation of the circuit of FIG. 2, the negative half cycle of the power supply provides for energization of heating element 15 and the bridge circuit in a sensing mode, as will be apparent from the detailed description set forth hereinafter.

The resistance of the bridge leg comprising resistor 29 is made slightly larger in relation to resistor 28 than the "cold" or room temperature resistance of heating element 15 relative to potentiometer 27. Thus, when the electrical heating device is first placed in operation, and heater 11 is relatively cool, during each negative half cycle, bridge terminal 23 is positive with respect to bridge terminal 24. As long as these conditions prevail, no appreciable charge is built up on capacitor 32 because diode 33 blocks the flow of charging current from terminal 23 to terminal 24.

As the next half cycle of the power supply begins, and terminal 25 goes positive with respect to terminal 22, diode 26 effectively blocks further flow of current to the bridge circuit. Thus, during the positive half cycle the bridge is effectively de-energized. During this half cycle, a positive supply voltage is supplied to the anode of power thyristor 41 and is also applied, through capacitor 42 and resistor 45, to the anode of sensing thyristor 34. In the absence of a charge on capacitor 32, however, no effective triggering current is supplied to the sensing rectifier 34 and this thyristor does not fire. Accordingly, all of the current through resistor 45 is applied through diode 44 to the gate electrode of power thyristor 41, gating the power rectifier into conduction at an early point in the positive half cycle. Through most of the positive half cycle, therefore, thyristor 41 is in conductive condition and heating current flows through the thyristor and through heating element 15, producing the requisite heating of member 11. This operating condition is shown in FIG. 3A, in which the supply voltage is shown as curve 50 and the voltage to thyristor 34 is shown by curve 51. The horizontal shading in the positive half cycle in FIG. 3A indicates the time in which power thyristor 41 conducts.

With continued operation, the increasing temperature of heating element 15 produces a corresponding increase in the resistance of the heating element because, as noted above, the heating element has a substantial positive thermal coefficient of resistivity. Ultimately, with continued operation, the relative resistance of heating element 15 exceeds that of the opposed leg of the bridge comprising resistor 29. Once this condition is reached, during each negative half cycle of the supply voltage bridge terminal 23 reaches a negative potential with respect to terminal 24. Under these circumstances, capacitor 32 is charged, with the polarity shown in FIG. 2, through capacitor 33, which is polarized to permit charging current to flow from terminal 24 to terminal 23.

It will be recognized that the potential across capacitor 32 is relatively small in comparison with the potential from terminal 23 to terminal 22 when the supply cycle is at the negative peak. Consequently, the net potential at terminal 36 is negative with respect to terminal 22 until the supply cycle approaches the 180° phase, as the cycle is illustrated in each of FIGS. 3A–3C. Thus, diode 35 blocks discharge of capacitor 32 for most of the negative half cycle. At some point near the 180° phase in the cycle, the potential between terminals 23 and 22 approaches zero and capacitor 32 begins to discharge through diode 35 and the gate electrode of rectifier 34. If the anode of thyristor 34 becomes sufficiently positive during this gate conduction period, the thyristor will begin to conduct and remain conductive during the complete positive half cycle of the supply voltage.

The relative timing of the firing points for the thyristors 34 and 41 determines the effect of pilot thyristor 34 upon the operation of power thyristor 41. For effective control action, pilot thyristor 34 must be capable of firing before power thyristor 41. If pilot thyristor 34 becomes conductive before power thyristor 41 fires, the pilot thyristor shunts the available gating current from the power thyristor and prevents the power thyristor from becoming conductive. Under these circumstances, with the power thyristor 41 prevented from firing, no heating current is supplied to heating element 15 during the positive half cycle of the power supply. On the other hand, if power rectifier 41 fires first, subsequent firing of pilot rectifier 34 can have no effect on the operation of the power rectifier and the heating element 15 is maintained energized during the conduction mode (the positive half cycle) for the circuit.

This relationship is best illustrated in FIGS. 3B and 3C. FIG. 3B shows the operating conditions for thyristors 34 and 41 under circumstances where heating element 15 is hot enough so that its resistance approaches the level affording bridge balance, a condition designated in the drawing as "warm." As in FIG. 3A, it is seen that the supply voltage 51 to the pilot thyristor 34 is slightly advanced in phase in comparison with the main supply voltage 50, due to the presence of capacitor 42 and resistor 45 in the circuit. These same components also serve to limit current flow in the gating circuit for thyristor 41. In FIG. 3B, as in FIG. 3A, the horizontal cross-hatching in the positive half cycle indicates firing and conduction in power thyristor 41; the vertical cross-hatching illustrates firing and conduction in the sensing thyristor 34. As shown in FIG. 3B, the gate thyristor 34 fires after the power thyristor 41 and hence cannot affect the operation of the power thyristor.

FIG. 3C, on the other hand, illustrates the circuit operation, as regards the signal-controlled rectifiers 34 and 41, under circumstances in which the heating element 15 is hot enough to create an appreciable imbalance in the bridge. Under these conditions, as indicated by the vertical cross-hatching in the positive half cycle, pilot thyristor 34 fires before the power thyristor 41 has an opportunity to go conductive. Under these circumstances, pilot thyristor 34 drains off the available gating signal current that would otherwise trigger power thyristor 41 to conduction. The power thyristor is not triggered to conduction and the supply of heating current to heating element 15 is cut off during the positive half cycle (the conduction mode).

While thyristor 34 is conductive, there is, of course, a voltage drop across the thyristor itself in the anode-cathode conduction path. Diode 44 is incorporated in the circuit to provide assurance that the voltage drop across the thyristor 34 will not be sufficient to fire the power thyristor 41. Resistor 37 is incorporated in the gating circuit for the gate thyristor 34 to prevent spontaneous firing of the pilot thyristor, which may sometimes occur since the gate thyristor is a relatively small and sensitive device.

It may be noted that there is no load impedance effectively connected to the terminal 43 for operation during the negative half cycle of the power supply. Nevertheless, this terminal must be loaded in order to obtain the desired phase shift for the supply voltage to gate thyristor 34 in comparison with the main supply voltage as applied to power thyristor 41. With many circuit components, the reverse leakage currents across diode 44 and thyristor 41 are sufficient to afford the limited loading required. In some circuits, it may be desirable to connect a high-impedance resistor across diode 44 or across thyristor 34 to increase the loading on terminal 43 and assure the requisite phase shift.

In the circuit of FIG. 2, current passes through heating element 15 and potentiometer 27 during every negative half cycle of the supply voltage. For the ultimate in bridge sensitivity, potentiometer 27 should approximate the resistance of heating element 15 and resistors 28 and 29 should also be approximately equal in value. However, if these impedance conditions are adhered to rigidly, there is a relatively large continuous heat dissipation from the heating element resistance 15, during sensing mode operation, giving a relatively high minimum temperature for heater 11. In addition, a strict equalization of the impedances as discussed above requires the use of a potentiometer 27 of high power capacity. Furthermore, resistors 28 and 29 should have relatively low resistance to effect rapid charging of capacitor 32.

Heat dissipation problems can be alleviated substantially by increasing the resistance of potentiometer 27 and resistor 28 in comparison to the resistances of heating element 15 and resistor 29. This produces some losses in bridge sensitivity but in many instances the sensitivity loss is not so great as to be unacceptable.

To change the control temperature for the circuit of FIG. 2, the adjustable tap 13 of potentiometer 27 is adjusted to modify the resistance in this leg of the bridge. For maximum sensitivity, the effective potentiometer impedance should match resistor 28 at some intermediate point in the potentiometer adjustment.

The thermal control of FIG. 2 affords suitable operation over a relatively wide range of temperature settings with adequate sensitivity. Unlike a thermostat control, it includes no switch contacts and no moving parts. The control affords inherent and effective averaging of the temperature across the entire surface of heater 11, since the principal control parameter is the total resistivity of heating element 15. Thus, the thermal control of FIG. 2 effectively eliminates overheating of heater 15 due to localized loading.

In order to afford a more complete example of the initial embodiment of the invention as illustrated in FIG. 2, circuit parameters and component types for a specific circuit of this kind are listed in Table I. This information is provided solely by way of illustration and not as a limitation on the invention.

TABLE I.—COMPONENTS, FIG. 2

Heating element 15—10 ohms cold
Potentiometer 750—750 ohms max.
Resistor 28—500 ohms
Resistor 29—20 ohms
Resistor 37—10 ohms
Resistor 45—4 ohms
Diodes 26, 31, 33, 35, 44
SCR 34—C6B
SCR 41—C31B
Capacitor 32—1 microfarad
Capacitor 42—0.1 microfarad FIG. 4 illustrates a modification of the circuit of FIG. 2 constituting another embodiment of the invention. FIG. 4 entails only a modification of the gating circuit means and the power switching means for the thermal control, comprising that portion of the circuit enclosed within phantom outline 61 in FIG. 2. That is, the circuit 61A of FIG. 4 replaces the circuit 61 of FIG. 2 with no additional change required in the bridge circuit or the heating element connections.

In the circuit 61A of FIG. 4, the power thyristor 41 is again connected between the power supply terminal 25 and the bridge terminal 23. In this instance, however, the connections for the pilot thyristor 64 are different from those for the pilot thyristor 34 of the previously described embodiment.

Thus, in FIG. 4 the anode of the pilot thyristor 64 is connected directly to the power supply terminal 25. The gate electrode of the pilot thyristor is connected through a diode 65 to the common terminal 66 between a capacitor 62 and a diode 63 that are connected in series in a circuit extending between the bridge terminals 23 and 24.

It is thus seen that capacitor 62 and diode 63, in this embodiment of the invention, are reversed in comparison with the comparable elements 32 and 33 in FIG. 2. A resistor 67 is connected between the gate electrode and the cathode of pilot thyristor 64, and the cathode of the pilot thyristor is connected to the gate electrode of power thyristor 41.

A principal operational difference for the circuit of FIG. 4, as compared with FIG. 2, is a change in the function of pilot thyristor 64. In FIG. 4 the pilot thyristor 64 is used to afford a positive triggering action for the power thyristor 41 instead of being employed to prevent energization of the power thyristor as in the initially described circuit.

Thus, with respect to the embodiment combining the circuits of FIG. 4, and FIG. 2, when the resistance of heating element 15 is on the low side of bridge balance and the supply voltage is in its negative half cycle, capacitor 62 is charged to the polarity illustrated in FIG. 4. This is made possible by the reversal in polarity of diode 63 (FIG. 4) as compared with diode 33 (FIG. 2). Upon initiation of the positive half cycle of the supply, capacitor 62 discharges through diode 65 and through the gate circuit of pilot thyristor 64 as well as through the gate circuit of thyristor 41, heating element 15, diode 31, and resistor 29. The discharge of capacitor 62 through this path fires pilot rectifier 64, which in turn fires power rectifier 41.

Pilot thyristor 64 is chosen as a sensitive device that can be rendered conductive by a much smaller current from discharge of capacitor 62 than would be required to fire power rectifier 41. While power thyristor 41 is conductive, diode 31 blocks current flow through resistors 27, 28 and 29; it should be noted that diode 31 is of greater importance in connection with the modification of FIG. 4 than in the original circuit of FIG. 2 and can be eliminated, if desired, in the construction illustrated in FIG. 2.

Considering further the operation of the circuit of FIG. 2 as modified in accordance with circuit 61A of FIG. 4, continued heating of resistance heating element 15 ultimately brings the resistance of the heating element from the low side of bridge balance to the high side. Under these circumstances, the potential across terminals 23 and 24 is reversed in polarity; consequently, capacitor 62 cannot be charged, due to the presence of diode 63. Under these circumstances, there is no gating signal available to trigger thyristors 41 and 64. Both thyristors remain nonconductive and no heating current is supplied to heating element 15 during the positive half cycle (conduction mode) for the supply voltage.

The modification illustrated in FIG. 4 affords some advantage with respect to the basic circuit illustrated in FIG. 2. The gating and power switching circuit of FIG. 2 causes a relatively large current pulse to pass through the gate circuit of pilot thyristor 34. This application of high current pulses to the gate electrode of the pilot thyristor is eliminated when the control is modified in accordance with FIG. 4.

FIG. 5 illustrates another gating and power switching circuit configuration 61B that may be incorporated in the circuit of FIG. 2 as a further embodiment of the present invention. Again, the bridge configuration remains unchanged. In circuit 61B, however, only a single power thyristor 41 is employed; there is no pilot thyristor in the gating circuit.

Thus, in the circuit of FIG. 5 the power switching means, the thyristor 41, is connected between the power supply terminal 25 and the bridge terminal 23. The anode of thyristor 41 is connected through a resistor 71 to the bridge terminal 24. A sensing capacitor 62 is connected in series with a diode 63 between the bridge terminals 23 and 24. The common terminal 66 intermediate diode 63 and capacitor 62 is connected directly to the gate electrode of power thyristor 41. A clamp diode 77 is connected between bridge terminals 23 and 24 in reverse polarity as compared with diode 63.

The operation of the control with the modification illustrated in FIG. 5 is essentially the same as described above for that embodiment incorporating the circuit of FIG. 4 except that discharge of capacitor 62 fires power thyristor 41 directly without utilization of a pilot thyristor. This circuit can be employed in instances in which there is a power thyristor of adequate capacity available that also is sufficiently sensitive to permit firing with the relatively low voltages available from the capacitor in the gating circuit. One further modification is afforded by the incorporation of clamp diode 77 in the circuit; this diode clamps bridge terminal 24 to the cathode of thyristor 41 during the positive half cycle. The overall effect of diode 77 is to shorten the discharge path of capacitor 62 so that it no longer includes the heating element and other members of the bridge.

FIG. 6 illustrates a further embodiment of the invention that incorporates many of the principles of the embodiments described above but with some substantial variations. In FIG. 6, heating element 15 again constitutes one leg of a bridge having terminals 121, 122, 123 and 124, the heating element being connected between bridge terminals 122 and 123. Bridge terminal 22 is connected to one power supply terminal 152.

One leg of the bridge adjacent heating element 15 comprises the series combination of a diode 126, a resistor 127, and a part of a potentiometer 125. The movable tap 13 on the potentiometer is connected to bridge terminal 121 and constitutes the temperature adjustment control for the bridge. The leg of the bridge between terminals 121 and 124 comprises the remainder of potentiometer 125 and a series resistor 128. The fourth leg of the bridge, between terminals 124 and 122, includes two diodes 131 in series with a resistor 129.

The gating circuit means for the circuit of FIG. 6 includes a gate or pilot thyristor 134 which is again a signal controlled rectifier. The anode of pilot thyristor 134 is coupled to one power terminal 151 through a sensing capacitor 132 and is also connected to the other power terminal 152 through a diode 133. The cathode of the pilot thyristor is connected to bridge terminal 121. The gate electrode of pilot thyristor 134 is connected to power supply terminal 151 through the series combination of a diode 138 and a resistor 139. A high impedance resistor 137 is connected between the gate electrode and the cathode of the pilot thyristor.

As in the previously described embodiments, the circuit of FIG. 6 includes a power thyristor 141, shown as a signal controlled rectifier. The anode of the power thyristor is connected to the power supply terminal 151 and the cathode is connected to bridge terminal 123 to afford an energizing circuit for heating element 15. The gate electrode of the power thyristor is connected through a diode 144 to bridge terminal 124.

In operation of the circuit of FIG. 5, during each negative half cycle (terminal 151 negative with respect to terminal 152) capacitor 132 is charged, through the charging circuit comprising diode 133, with the indicated polarity. At the beginning of the positive half cycle, as power supply terminal 151 begins to go positive with respect to terminal 152, a gating signal is supplied to the gate electrode of pilot thyristor 134 through a circuit comprising resistor 139 and diode 138. At an early point in the positive half cycle, therefore, thyristor 134 is triggered to its conductive state and capacitor 132 discharges through the pilot thyristor and the bridge. The discharge current from capacitor 132 follows two paths through the bridge; the first path extends through a part of potentiometer 125, resistor 127, diode 126, and heating element 15 to power supply terminal 122. The second path through the bridge goes through a part of potentiometer 125, resistor 128, diodes 131, and resistor 129 to terminal 122.

In this circuit, the pilot thyristor 134 fires in each negative half cycle of operation regardless of the thermal condition or resistivity of heating element 15. However, the pilot thyristor remains conductive for only a very short time interval, in comparison with the duration of a half cycle of the power supply, its conductive period being determined by the charge available on capacitor 132. Thus, the bridge comprising heating element 15 is energized from the pilot thyristor only for a brief period in each cycle of the supply voltage. Stated differently, the pilot thyristor 134 supplies a short pulse of current to the bridge in each cycle of the supply voltage.

When the heating device is first placed in operation the heating element 15 is relatively cold and has a resistance less than the resistance of the adjacent leg comprising resistor 129 and diodes 131. Under these circumstances, bridge terminal 124 is driven positive with respect to terminal 123 by the pulse discharge current supplied to the bridge from pilot thyristor 134. Thus, there is a current flow across the bridge from terminal 124 to terminal 123 through diode 144 and through the gating circuit for power thyristor 141. Accordingly, the power thyristor is triggered to conduction and remains conductive throughout the positive half cycle of the supply voltage. In this manner, power thyristor 141 supplies the requisite conduction mode heating current to heating element 15.

When heating element 15 subsequently reaches a temperature at which its resistance exceeds that of the adjacent leg comprising resistor 129, the pulse current from pilot thyristor 134 occurring at the beginning of the positive half cycle drives bridge terminal 123 positive with respect to bridge terminal 124. But diode 144 blocks the flow of current across the bridge from terminal 123 to terminal 124, so that no effective firing signal is supplied to power thyristor 141. Consequently, when the heating element 15 is hot, the power thyristor does not conduct and the heating current to element 15 is cut off.

The pulse excitation of the bridge in the circuit of FIG. 6 affords a substantial advantage in comparison with the previously described embodiments. The short duration of the sensing mode signal supplied to the bridge by the pilot thyristor makes it possible to apply a relatively high voltage to the bridge, even with bridge resistors of relatively low impedance, without substantial possibility of damage to the bridge. Since the resistances in the bridge can now be approximately the same as the resistance of heating element 15, maximum bridge sensitivity is obtained without introducing undue heat dissipation in heating element 15 or in the other bridge resistors. Furthermore, pulse excitation of the bridge makes it possible to energize heating element 15 during most of both half cycles of the supply voltage, with a minor circuit modification as explained more fully in connection with FIG. 8.

In FIG. 6, the sharp pulse applied to the bridge circuit during sensing mode operation must traverse the power line, and may introduce problems due to the uncontrolled nature of the power line impedance. That is, power line impedance characteristics can cause distortion of the pulse of a rather unpredictable nature, which may in turn affect control action. FIG. 7 illustrates a circuit 161A that may be substituted for the portion 161 of the circuit of FIG. 6 to minimize or eliminate this particular difficulty.

In FIG. 7, the gating circuit means for the control again comprises a pilot thyristor 134 having its cathode connected to the bridge terminal 121. Moreover, and as in FIG. 6, the gate electrode of the pilot thyristor is connected to the power supply terminal 151 through the series combination of the diode 138 and the resistor 139. The cathode of the pilot thyristor is again connected to the power line terminal 152 through the diode 133.

However, the pulse initiating capacitor 162, in FIG. 7, is connected from the cathode of pilot thyristor 134 to the power line terminal 151 through the series combination of a resistor 164 and a diode 165. In addition, a connection is provided from capacitor 162 to the bridge terminal 122, which is returned to power supply terminal 152 through a diode 163.

The basic operation of the circuit of FIG. 7 is essentially the same as for FIG. 6. In this instance, however, capacitor 162 is initially charged during the negative half cycle through a circuit that comprises diode 133, resistor 164, and diode 165. Resistor 164 provides protection to diodes 133 and 165 by limiting the charging current. Diode 165 serves to isolate resistor 164 during the positive half cycle of the power supply and lowers heat dissipation in that resistor.

FIG. 8 illustrates a thermal control for a hot plate or similar electrical heating device that is generally similar to FIG. 6 but is modified somewhat in the gating circuit of the control and that also provides for full cycle excitation of the heating element 15. The bridge circuit in which heating element 15 is incorporated, in FIG. 8, is the same as in FIG. 6 except for the connection to the anode of the power thyristor 141. In FIG. 8 the anode of the power thyristor is connected to the power line terminal 151 through the primary winding 183 of an iron-core transformer 182. The secondary winding 184 of the transformer is connected to terminal 151 and to the gate electrode of a second power thyristor 181. Thyristor 181, like thyristor 141, is a signal controlled rectifier. A pair of diodes 185 are connected in series with each other across the transformer secondary 184. The cathode of thyristor 181 is connected to terminal 151 and the anode is connected to heating element 15 at bridge terminal 123.

The gating circuit means for FIG. 8 again includes a pilot or gate thyristor 134 having its cathode connected to the input terminal 121 of the bridge. As in FIG. 6, the gate electrode of the pilot thyristor is connected to line terminal 151 by the series combination of the diode 138 and the resistor 139. As before, a resistor 137 is connected between the gate electrode of the cathode of the pilot thyristor.

The anode circuit for the pilot thyristor in FIG. 8 is also similar to that in FIG. 6 but with some modifications. Thus, the anode of the pilot thyristor is coupled to power terminal 151 through the capacitor 132 but in this instance a resistor 171 is connected in series between the capacitor and the power line terminal. The cathode of pilot thyristor 134 is connected to the other power line terminal 152 through the diode 133, but a current limiting resistor 172 is connected in series with the diode. In addition, a capacitor 173 is connected between power line terminal 152 and the common terminal 174 of resistor 171 and capacitor 132.

The gating circuit shown in FIG. 8 affords an alternate means for preventing the signal pulse used to excite the bridge from traversing the power line and thus avoids the difficulties that may be presented due to power line impedance characteristics. In FIG. 8, the discharge pulse from capacitor 132 through pilot thyristor 134, after passing through the bridge, is coupled back to the terminal 174 of capacitor 132 through a relatively low impedance afforded by capacitor 173. That is, the gating pulse charges capacitor 173 and is not required to traverse the A.C. supply 14. Resistor 171 presents a relatively high impedance to the pulse currents and minimizes their entry into the power line. Resistor 172 also serves as a current limiting device to prevent pulse current from exceeding the peak current ratings of the diodes in the circuit and to prevent damage in the event of spurious firing of pilot thyristor 134.

As noted above, FIG. 8 also provides for full wave conduction mode excitation of heating element 15. When the first power thyristor 141 fires, as described above, the magnetic core of transformer 182 is magnetized and a magnetic field is built up that encompasses the secondary winding 184 of the transformer. Upon completion of the positive half cycle, during most of which thyristor 141 is conductive, this magnetic field collapses, inducing a current in the secondary winding 184 of the transformer.

The collapse of the magnetic field requires a sufficient time so that the current in the secondary winding is available at the beginning of the negative half cycle and, being applied to the gate electrode of the second power thyristor 181, triggers that thyristor into conduction. Diodes 185 are provided to protect the gate electrode circuit of thyristor 181 from reverse potential. The firing of the second power thyristor 181 on the negative half cycle of the power supply of course has no effect on the charging of capacitor 132 during this same half cycle. It is thus seen that, with the circuit of FIG. 8, the sensing mode of operation in which the bridge is pulsed requires only a small fractional portion of each cycle of the supply voltage; the heating element 15 is energized in the conduction mode during the principal portion of each half cycle of the supply voltage. Of course, since the firing of power thyristor 181 is dependent upon the previous triggering of power thyristor 141, the heating of element 15 to a temperature sufficient to cut off the first power thyristor is also effective to cut off the second power thyristor.

The foregoing circuit descriptions are predicated upon the assumption that control action occurs when the bridge, in each instance, is precisely balanced. In actual practice, the control effect often takes place somewhat off of bridge balance because the bridge must supply finite minimum gate voltages and diode voltage drops. Nevertheless, each of the foregoing circuits can be accurately and effectively calibrated to afford the relatively precise control required for laboratory and similar applications.

The gate electrode connection in a signal controlled rectifier is, essentially, a PN junction. Consequently, the temperature characteristics for the gate electrode are quite similar to those of a diode. In many instances, the gate diode voltage may be balanced by voltage drops across diodes in other portions of the circuit. This is the purpose of the diodes 126 and 131 in the circuits of FIGS. 6 and 8, for example. When such compensation is not used, variations in the voltage drop for the gate electrode caused by changes in ambient temperature may cause shifts in the controlled temperature of the heating device because the bridge is required to shift off balance to supply the required voltage drop. In addition to compensating for this effect, the balancing diodes serve the further purpose of rendering the control circuit and the controlled temperature substantially independent of the applied line voltage.

In order to afford a more complete illustration of a specific embodiment of the thermal control of FIG. 8, impedance values and component types for one form of that circuit are set forth in Table II. This information is provided only by way of illustration and not as a limitation on the invention.

TABLE II.—COMPONENTS FOR FIG. 8

Heating element 15—15 ohms max.
Potentiometer 125—10 ohms
Resistors 127, 128, 129—15 ohms
Resistor 137—10 kilohms
Resistor 139—68 kilohms
Resistors 171, 172—270 ohms
Capacitors 132, 173—0.22 microfarad
SCR 134—C6B
SCR's 141, 181—C31B
Diodes Hence, while preferred embodiments of the invention have been described and illustrated, it is to be understood that they are capable of variation and modification.

I claim:

1. An electrical heating device energized from an A.C. power supply, comprising:
 a heating element having a substantial and predictable thermal coefficient of resistivity;
 a bridge circuit having the heating element connected in one leg thereof;
 means for energizing said bridge from said power supply in a sensing mode during sensing intervals each comprising a given fractional portion of the supply cycle;
 gating circuit means for deriving a gating signal from said bridge, representative of the instantaneous average thermal condition of said heating element, as indicated by changes in balance conditions within the bridge;
 power switching means comprising at least one power thyristor having input, output, and gate electrodes, said input and output electrodes being connected in series between the power supply and said heating element;
 and means for applying said gating signal to the gate electrode of said power thyristor to control energization of said heating element through said power thyristor in a conduction mode.

2. An electrical heating device according to claim 1 in which said gating signal is applied to the gating electrode of said power thyristor during gating intervals immediately subsequent to said sensing intervals, said device further comprising means for preventing interference between sensing mode and conduction mode operations in the device.

3. An electrical heating device according to claim 2 in which the sensing intervals constitute half cycles of one polarity of the power supply and in which said interference preventing means comprises at least one diode connecting said bridge circuit to the power supply to afford energization of the bridge during half cycles of said one polarity and to preclude energization of the bridge during half cycles of opposite polarity.

4. An electrical heating device according to claim 2 in which said gating circuit means comprises a sensing thyristor having input, output and gate electrodes, a sensing capacitor connected across said bridge in a polarized charging circuit so as to be charged only when the leg of said bridge containing said heating element is in a given unbalanced condition, the gate electrode of said sensing thyristor being connected to said sensing capacitor to control firing of said sensing thyristor in accordance with the charge condition of said sensing capacitor, and said input and output electrodes of said sensing thyristor being connected in the gate electrode circuit for said power thyristor to control application of a gating signal thereto.

5. An electrical heating device according to claim 2 in which said gating circuit means comprises a sensing capacitor connected across said bridge in a polarized charging circuit so as to be charged only when the leg of said bridge containing said heating element is in a given unbalanced condition, the gate electrode of said power thyristor being coupled to said charging capacitor to control firing of said power thyristor in accordance with the charge condition of said sensing capacitor.

6. An electrical heating device according to claim 2 in which said gate electrode of said power thyristor is connected to a first terminal of said bridge circuit diagonally opposite a second bridge terminal to which said heating element is connected, said output electrode of said power thyristor is connected to said second bridge terminal, and said input electrode of said power thyristor is connected to the power supply, and in which said means for energizing said bridge constitutes a part of said gating circuit means, said gating circuit means being connected to said power supply and to said bridge and comprising a pulse signal source for energizing said bridge with a signal pulse only during limited sensing intervals each limited to a minor fractional portion of a given half-cycle of said power supply.

7. An electrical heating device according to claim 6 in which said gating circuit means includes a capacitor connected to said power supply in a polarized charging circuit for charging said capacitor in each half cycle of the power supply of given polarity, and said pulse signal source comprises a pilot thyristor having input and output electrodes connected between said capacitor and a third terminal of said bridge and further having a gate electrode connected to said power supply so that the energizing pulses supplied to said bridge are limited to current derived from discharge of said capacitor.

8. An electrical heating device according to claim 6 in which the gate electrode voltage drop of the power thyristor is balanced, and the bridge circuit is compensated for changes in ambient temperature, by diodes incorporated in series in opposed legs of the bridge circuit.

9. An electrical heating device according to claim 6 and further including a second power thyristor having input and output electrodes connected in series between the power supply and said heating element, said second power thyristor having a gate electrode coupled to the first power thyristor in a firing circuit for firing said second power thyristor only during half cycles of the power supply following half cycles in which the first power thyristor has been fired to permit effective control of substantially full-wave energization of said heating element.

10. An electrical heating device according to claim 9 in which said firing circuit for said second power thyristor comprises an iron-core transformer having a primary winding connected in series with one of the input and output electrodes of the first power thyristor and a secondary winding connected in series with the gate electrode of said second power thyristor.

References Cited

UNITED STATES PATENTS

| | | | |
|---|---|---|---|
| 2,866,067 | 12/1958 | Dolan et al. | 219—499 |
| 2,918,558 | 12/1959 | Evans | 219—499 |
| 3,215,818 | 11/1965 | Deaton | 219—499 |
| 3,315,063 | 4/1967 | Ihlenfeldt | 219—497 |
| 3,431,399 | 3/1969 | Venning | 219—497 |

BERNARD A. GILHEANY, Primary Examiner

F. E. BELL, Assistant Examiner

U.S. Cl. X.R.

219—505